United States Patent
Doshi

(10) Patent No.: US 7,505,953 B2
(45) Date of Patent: Mar. 17, 2009

(54) PERFORMANCE MONITORING OF METHOD CALLS AND DATABASE STATEMENTS IN AN APPLICATION SERVER

(75) Inventor: Rutvik Doshi, Framingham, MA (US)

(73) Assignee: Computer Associates Think, Inc., Islandia, NY (US)

( * ) Notice: Subject to any disclaimer, the term of this patent is extended or adjusted under 35 U.S.C. 154(b) by 465 days.

(21) Appl. No.: 10/750,104

(22) Filed: Dec. 29, 2003

(65) Prior Publication Data

US 2005/0010578 A1 Jan. 13, 2005

Related U.S. Application Data

(60) Provisional application No. 60/486,836, filed on Jul. 11, 2003.

(51) Int. Cl.
*G06F 17/30* (2006.01)

(52) U.S. Cl. .......................................... 707/1; 707/101

(58) Field of Classification Search ............. 707/103 R, 707/104.1, 10, 100–102, 200, 1–5; 717/127–128, 717/132
See application file for complete search history.

(56) References Cited

U.S. PATENT DOCUMENTS

| | | | | |
|---|---|---|---|---|
| 6,041,327 | A | 3/2000 | Glitho et al. ................... 707/10 |
| 6,338,159 | B1 | 1/2002 | Alexander, III et al. ...... 717/128 |
| 6,539,501 | B1 | 3/2003 | Edwards ....................... 714/45 |
| 6,665,672 | B2 | 12/2003 | Myers et al. ................... 707/10 |
| 6,671,686 | B2 | 12/2003 | Pardon et al. .................. 707/8 |
| 6,748,555 | B1 * | 6/2004 | Teegan et al. ................. 714/38 |
| 6,816,874 | B1 * | 11/2004 | Cotner et al. ............... 707/204 |
| 6,874,099 | B1 * | 3/2005 | Balasubramanian et al. ... 714/4 |
| 6,901,582 | B1 * | 5/2005 | Harrison ..................... 717/127 |
| 7,076,547 | B1 * | 7/2006 | Black .......................... 709/224 |
| 2002/0016814 | A1 * | 2/2002 | Convent et al. ............. 709/203 |
| 2002/0062237 | A1 * | 5/2002 | Matsumoto et al. ........... 705/7 |
| 2003/0110007 | A1 * | 6/2003 | McGee et al. ............... 702/179 |
| 2004/0210877 | A1 * | 10/2004 | Sluiman et al. ............. 717/130 |
| 2004/0268314 | A1 * | 12/2004 | Kollman et al. ............. 717/128 |

OTHER PUBLICATIONS

International Search Report for PCT/US2004/021754 issued Jan. 7, 2005; 8 pages.
"Introducing IronTrack SQL," *IronGrid, IronTrack SQL Overview*, pp. 1-3, <http://www.irongrid.com/documentation/irontracksql/overview.html>, visited Jul. 28, 2004.
"Introducing IronEye SQL," *IronGrid, IronEye SQL Overview*, pp. 1-3, <http://www.irongrid.com/documentation/ironeyesql/overview.html>, visited Jul. 28, 2004.

* cited by examiner

*Primary Examiner*—Cheryl Lewis
(74) *Attorney, Agent, or Firm*—Pillsbury Winthrop Shaw Pittman LLP

(57) ABSTRACT

In one embodiment, a method for monitoring performance of one or more methods and one or more database calls each associated with at least one method, includes correlating a database call generated by a method with the method that generated the database call. The method also includes monitoring one or more parameters associated with the database call and displaying to a client a first identifier of the database call, a second identifier of the method that generated the database call, and one or more of the one or more parameters associated with the database call.

24 Claims, 3 Drawing Sheets

PERFORMANCE MONITORING OF METHOD CALLS AND DATABASE STATEMENTS IN AN APPLICATION SERVER

RELATED APPLICATION

This application claims the priority under 35 U.S.C. §119 of provisional application Ser. No. 60/486,836 filed Jul. 11, 2003.

TECHNICAL FIELD

This disclosure relates generally to the field of computer systems, and more particularly to performance monitoring of method calls and database statements in an application server.

BACKGROUND

Many organizations such as business organizations are moving their web and enterprise applications to the Java 2 Enterprise Edition (J2EE) architecture. The J2EE architecture generally promotes multi-tiered applications. An important tier in a J2EE application is typically the database connectivity layer, which generally enables Java applications that reside on a J2EE server to query an associated database using, for example, a standard SQL call. Some companies developing database performance tuning and development tools (e.g., IronGrid) have a tool that allows users to view all of the SQL statements flowing through a Java application and the database.

SUMMARY

This disclosure provides for performance monitoring of method calls and database statements in an application server.

In one embodiment, a method includes correlating a database call generated by a method with the method that generated the database call. The method also includes monitoring one or more parameters associated with the database call and displaying to a client a first identifier of the database call, a second identifier of the method that generated the data base call, and one or more of the one or more parameters associated with the database call.

BRIEF DESCRIPTION OF THE DRAWINGS

For a more complete understanding of the present disclosure and its advantages, reference is now made to the following descriptions, taken in conjunction with the accompanying drawings, in which.

DESCRIPTION OF EXAMPLE EMBODIMENTS

Figure 1:
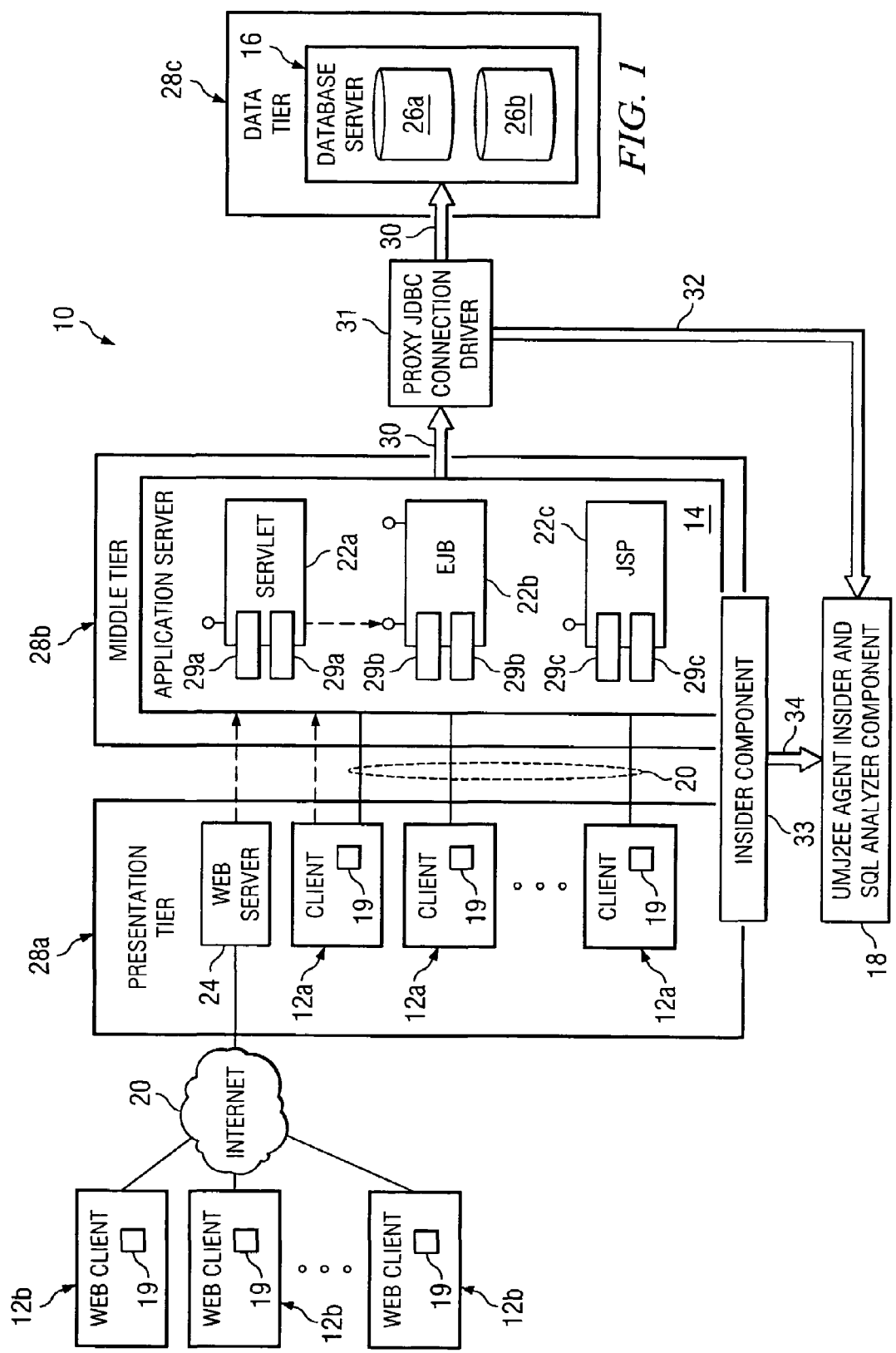
FIG. 1 illustrates an example system for performance monitoring of method calls and database statements in an application server.

FIG. 1 illustrates an example system 10 for performance monitoring of method calls and database statements in an application server. In one embodiment, system 10 includes one or more clients 12, an application server 14, a database server 16, and an analyzer component 18. In general, system 10 enables clients 12 to identify slow and underperforming database calls by monitoring and visualizing database calls, and the method calls generating the database calls, in a management console 19 that is displayable on client 12. In one embodiment, management console 19 displays the entire flow of methods with slow or underperforming database call statements.

Clients 12 access services provided by applications on application server 14. Each client 12 may include input devices, output devices, mass storage media, processors, memory, interfaces, communication ports, or other appropriate components for interacting with application server 14 and viewing output. Although a particular number of clients 12 are shown, system 10 may include any suitable number of clients 12 according to particular needs. As used in this document, client 12 is intended to encompass a personal computer, workstation, network computer, kiosk, wireless data port, personal digital assistant (PDA), one or more processors within these or other devices, or any other suitable processing device. Moreover, "client 12" and "user of client 12" may be used interchangeably without departing form the scope of this disclosure. For example, client 12 may comprise a computer that includes an input device, such as a keypad, touch screen, mouse, or other device that can accept information, and an output device that conveys information associated with the operation of application server 14 or clients 12, including digital data, visual information, or other suitable information. Both the input device and output device may include fixed or removable storage media such as a magnetic computer disk, CD-ROM, or other suitable media to both receive input from and provide output to users of clients 12 through a portion of a web interface. In one embodiment, clients 12 include HyperText Markup Language (HTML) pages and applets running in browsers, Java applications, and other applications that can interoperate with Java.

Clients 12 may communicate with application server 14 using a network 20. Network 20 facilitates wireless or wireline communication between application server 14 and any other computer such as clients 12. Network 20 may communicate, for example, Internet Protocol (IP) packets, Frame Relay frames, Asynchronous Transfer Mode (ATM) cells, voice, video, data, and other suitable information between network addresses. Network 20 may include one or more local area networks (LANs), metropolitan area networks (MANs), wide area networks (WANs), all or a portion of a global network such as the Internet, or any other communication system or systems at one or more locations.

Application server 14 includes an electronic computing device operable to receive, transmit, process, and store data associated with system 10. For example, application server 14 may include a general-purpose personal computer (PC), a Macintosh, a workstation, a Unix-based computer, a server computer, or any other suitable device. In one embodiment, application server 14 includes software that runs between web browser-based client applications and databases and applications. Application server 14 may handle application logic and connectivity. Application server 14 may support clients 12 by offering an integrated suite of distributed computing capabilities. In one embodiment, application server 14 includes a J2EE application server.

Application server may include one or more applications 22. In one embodiment, each application 22 may include a J2EE servlet application 22*a*, an Enterprise Java Beans (EJB) application 22*b*, a JavaServer Pages (JSP) application 22*c*, or any other suitable type of application, according to particular needs. An EJB application 22*b* may include an entity bean application 22*b*, a stateful session bean application 22*b*, a stateless session bean application 22b, or any other suitable type of EJB application 22b. In one embodiment, application server 14 is associated with a web server 24. Web server 24 may allow web clients 12b to interact with application server 14 using a network 20 such as the Internet, for example. In one embodiment, J2EE servlet applications 22a and JSP applications 22c generally assist in web-based communication with clients 12.

Database server 16 may include one or more databases 26. Although described as a database server, database server 16 may be more broadly referred to as an information server, which includes databases 26 or other suitable information components such as spreadsheets or flat files. Reference to "database server 16" is meant to include "information server," and reference to "databases 26" is meant to include other suitable information components. Although a particular number of databases 26 are shown, database server 16 may include any suitable number and types of databases 26. Each database 26 may store and facilitate retrieval of information used by applications 22 associated with application server 14. Each database 26 may include any hardware, software, firmware, or combination thereof operable to store and facilitate retrieval of information. Also, each database 26 may use any of a variety of data structures, arrangements, and compilations to store and facilitate retrieval of information.

In one embodiment, system 10 is implemented using a Java 2 Enterprise Edition (J2EE) architecture, which generally promotes applications to be multi-tiered. Although the present disclosure focuses on an embodiment in which system 10 is implemented using the J2EE architecture, system 10 may be implemented using any suitable architecture, according to particular needs, without departing from the scope of this disclosure. In an embodiment in which system 10 is implemented using the J2EE architecture, system 10 may be divided into one or more tiers 28. In one embodiment, tiers 28 include a presentation tier 28a, a middle tier 28b, and a data tier 28c. Tiers 28 may describe a logical arrangement of system 10 or a physical arrangement of system 10 according to particular needs.

In one embodiment, presentation tier 28a includes one or more clients 12a. In an embodiment in which application server is associated with web server 24, presentation tier 28a may include web server 24. In this embodiment, it may be desirable to not include web clients 12b in presentation tier 28a, although this is not required. Middle tier 28b may include one or more application servers 14 running one or more applications 22. Application server 14 may include a J2EE application server. Data tier 28c may include one or more database servers 16, each including one or more databases 26.

Application tier 28a presentation tier 28b and data tier 28c may include one or more computers, and the servers (and similarly clients 12, application server 14, database server 16, analyzer component 18, and web server 24) may each include one or more computers at one or more locations and may share data storage, communications, or other resources according to particular needs. For example, functionality described in connection with clients 12, application server 14, database server 16, analyzer component 18, and web server 24 may be provided using a single computer system, which in a particular embodiment might include a conventional desktop or laptop computer. Furthermore, functionality described in connection with clients 12, application server 14, database server 16, analyzer component 18, and web server 24 may be provided using any suitable software components. Each computer system may include one or more suitable input devices, output devices, mass storage media, processors, memory, or other components for receiving, processing, storing, and communicating information according to the operation of system 10.

Applications 22 on application server 14 may include one or more methods 29, which may generate database calls 30 such as SQL calls 30, for example, to a database 26. For example, methods 29 may generate database calls 30 to a database 26 in response to interaction with a client 12. As another example, methods 29 may spontaneously generated database calls 30 to a database 26. Although methods 29 are described as methods, the present invention contemplates methods 29 being methods, functions, applications, objects, or any other suitable collection of computer code. In one embodiment, applications 22 use a Java Database Connectivity (JDBC) Application Program Interface (API) for generating SQL calls 29. In this embodiment, methods 29 may include Java methods 29 making JDBC calls. In one embodiment, client 12 interactions trigger data flows from presentation tier 28a to application server 14 (middle tier 28b) and ultimately to a database 26 (data tier 28c). Although database calls 30 generated by methods 29 may be any suitable type of database calls 30, for simplicity the remainder of this disclosure will refer to database calls 30 as SQL calls 30. SQL calls 30 may cause a bottleneck in the performance and response time of methods 29, and ultimately of applications 22. In one embodiment, analyzer component 18, in conjunction with interceptor component 31 and insider component 33, provides a way to identify problematic (e.g., slow) SQL calls 30 and the Java methods 29 (e.g., JDBC calls) within applications 22 that made the problematic SQL calls 30.

To intercept SQL calls 30 flowing from methods 29 within applications 22 on application server 14 to a database 26 on database server 16, an interceptor component 31 may be installed in system 10. As used in this disclosure, the term "intercept" may include capturing and redirecting, copying, determining certain information (i.e., parameters), or any other suitable action, according to particular needs. For example, interceptor component 31 may capture SQL calls 30 and redirect them to analyzer component 18. As another example, interceptor component 30 may copy the SQL calls 30 and forward the copy to analyzer component 18. As yet another example, interceptor component 30 may determine certain parameters associated with SQL calls 30 and merely forward the parameters to analyzer component 18. Interceptor component 31 may be installed on application server 14, on database server 16, "between" application server 14 and database server 16, or at any other suitable location according to particular needs. In one embodiment, interceptor component 31 includes a Proxy JDBC Driver, which may be developed using Java Dynamic Proxy Framework and capable of working with JDBC compliant databases 26. In general, interceptor component 31 intercepts SQL calls 30 from methods 29 within applications 22 and communicates one or more parameters 32 associated with the intercepted SQL calls 30 to analyzer component 18. For a particular intercepted SQL call 30, parameters 32 may include a SQL statement of the intercepted SQL call 30, SQL execution time of the intercepted SQL call 30, SQL exceptions of the intercepted SQL call 30, or any other suitable parameters 32.

System 10 also includes an insider component 33 associated with application server 14 for intercepting methods 29 such as JDBC calls for applications 22. The term "intercept" may be broadly defined as described above with reference to interceptor component 31. In one embodiment, insider component 33 resides on application server 14. In general, insider component 33 intercepts methods 29 associated with one or more applications 22 and sends the one or more parameters 34 associated with the intercepted method 29 to analyzer component 18. Parameters 34 may include a timestamp of the associated method 29. In one embodiment, insider component 33 monitors and intercepts each Java method 29 in entire Java method call trees.

Analyzer component 18 may include any suitable hardware or software component. In one embodiment, analyzer component 18 may be thought of as an agent that includes software components that monitor certain managed objects and report their status to a manager component. In this embodiment, the manager component may include a graphical utility that is used to discover and configure the agent (e.g., analyzer component 18), view the status of the managed objects, and launch reports. In general, analyzer component 18 correlates each intercepted SQL call 30 with the method 29 that generated the SQL call 30 by comparing one or more parameters 32 for each intercepted SQL call 30 received from interceptor component 31 with one or more corresponding parameters 34 for each method 29 received from insider component 33. For example, analyzer component 18 may consider an invocation timestamp and a thread of execution for each intercepted SQL call 30 and each method 29. In one embodiment, if the execution thread and the timestamps for an intercepted SQL call 30 and a method 29 match each other, then analyzer component 18 correlates the SQL call 30 received from interceptor component 31 with the method 29 received from insider component 33. Although this particular example is described, analyzer component 18 may correlate each SQL call 30 with the method 29 that generated the SQL call 30 in any suitable manner, according to particular needs.

In one embodiment, analyzer component 18 initiates generation and or update of management console 19 on client 12 to reflect the determined correlation. Analyzer component 18 may initiate communication of an alert notification to client 12 if certain conditions are met or certain thresholds are exceeded. For example, if the execution time for a particular SQL call 30 exceeds a predetermined threshold execution time, analyzer component 18 may initiate communication of an alert notification to client 12, notifying client 12 that the SQL call 30 exceeded the predetermined threshold execution time, for example. In one embodiment, the alert notification may be communicated in lieu of generation or update of management console 19. Management console 19 or alert notifications may allow client 12 to monitor performance and response time of applications 22 and associated SQL calls 30. For each SQL call 30, allowing client 12 to view one or more parameters 32 of the SQL call 30 (e.g., SQL execution time) and the method 29 that generated the SQL call 30 (e.g., via management console 19 or an alert notification) may allow client 12 to identify bottlenecks in performance and response time of methods 29 and ultimately of applications 22. This capability may allow client 12 to plan for technology changes, future needs, and other suitable business and technology considerations.

In operation of system 10, a client 12 may trigger a data flow within system 10. For example, client 12 may interact with an application 22 on application server 14. An application 22 on application server 14 may respond to the data flow triggered by client 12. A method 29 within an application 22 may generate a SQL call 30 in response to the data flow. Interceptor component 31 may intercept the SQL call 30 and communicate one or more parameters 32 for the intercepted SQL call 30 to analyzer component 18. Insider component 33 may intercept methods 29, such as JDBC calls, and communicate one or more parameters 34 for the intercepted methods 29 to analyzer component 18. Analyzer component 18 may correlate the intercepted SQL call 30 to the method 29 that generated the intercepted SQL call 30. In one embodiment, analyzer component 18 may perform this correlation by comparing one or more parameters 32 for the intercepted SQL call 30 received from interceptor component 31 with one or more corresponding parameters 34 associated with an method 29 received from insider component 33 to determine whether the method 29 generated the intercepted SQL call 30. In one embodiment, if analyzer component 18 determines that one or more parameters 32 associated with the intercepted SQL call 30 match one or more corresponding parameters 34 associated with a particular method 29, then analyzer component 18 concludes that the particular method 29 generated the intercepted SQL call 30.

When the analyzer component correlates the intercepted SQL call 30 with the method 29 that generated the intercepted SQL call 30, analyzer component 18 may notify client 12. For example, analyzer component 18 may initiate generation or update of management console 19 that is displayable on client 12. As another example, analyzer component 18 may initiate communication of a alert notification to client 12. In one embodiment, analyzer component may communicate an alert notification to client 12 if one or more of the parameters 32 associated with the intercepted SQL call 30 exceeds a predetermined threshold.

In certain embodiments, data flows are substantially continuously being generated by clients 12 (or spontaneously) such that interceptor component 31 is substantially continuously intercepting SQL calls 30 and communicating parameters 31 for each intercepted SQL call 30 to analyzer component 18. Similarly, insider component 33 may be substantially continuously intercepting methods 29 such as JDBC calls and communicating parameters 34 associated with the intercepted methods 29 to analyzer component 18. Analyzer component 18 may substantially continuously correlate received intercepted SQL calls 30 with the methods 29 that generated the received intercepted SQL calls 30, such that correlation is performed in substantially real time. In this embodiment, system 10 may enable client 12 to be notified of underperforming SQL calls 30 and their associated methods 29 in substantially real time.

Figure 2:
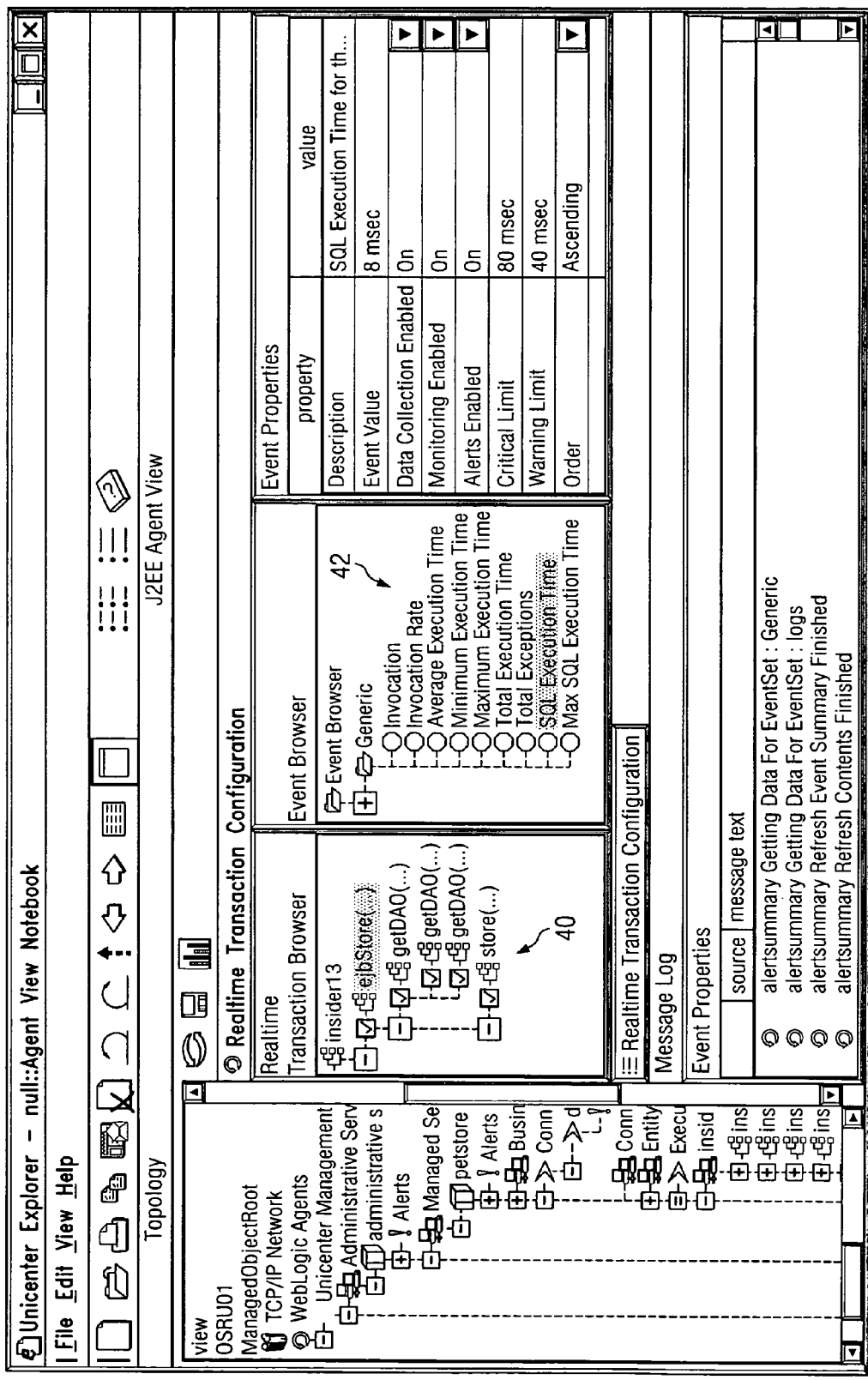
FIG. 2 illustrates an example management console, which may allow a client to visualize underperforming SQL calls and the methods that generated the SQL calls.

FIG. 2 illustrates an example management console 19, which may allow a client 12 to visualize underperforming SQL calls 30 and the methods 29 that generated the SQL calls 30. It should be understood that example management console 19 is for illustration purposes only and that management console 19 may include any suitable structure, format, and data according to particular needs. Management console may include a graphical user interface (GUI) displayable on client 12. Generally, management console 19 provides client 12 with an efficient and user-friendly presentation of data provided by system 10, such as a unified display of disparate output. Management console 19 may include a plurality of displays having interactive fields, pull-down lists, windows, and buttons operated by the user of client 12. In one embodiment, management console 19 presents formatted output and receives commands from client 12. Management console 19 contemplates any graphical user interface, such as a generic web browser, that processes information in system 10 and efficiently presents the information to the user of client 12. Application server 14 (or web server 24, where appropriate) can accept data from client 12 via the web browser (e.g., Microsoft Internet Explorer or Netscape Navigator) and return appropriate HTML or Extensible Markup Language (XML) responses.

In one embodiment, management console 19 shows the user of client 12 a tree 40 of methods 29. For example, tree 40 of methods 29 may include Java method call sequences. Each Java method call in the sequence may have one or more events 42. In one embodiment, an event 42 includes an unsolicited notification from a manager or agent that indicates that a threshold limit was exceeded, a network topology has changed, an informational message or an error occurred, an application alert occurred, or any other suitable occurrence. As examples, each method 29 in the sequence may have events 42 for SQL execution time, maximum SQL execution time, SQL statement (not present in the illustrated screen shot), or any other suitable events 42. A SQL execution time event 42 may include the performance of the last SQL call 30 made by the method 29 in a certain unit of time (e.g., milliseconds). A maximum SQL execution time event 42 may include the performance of the worst SQL call 30 made by the method 29. A SQL statement event 42 may include the exact SQL query made by the method 29.

Figure 3:
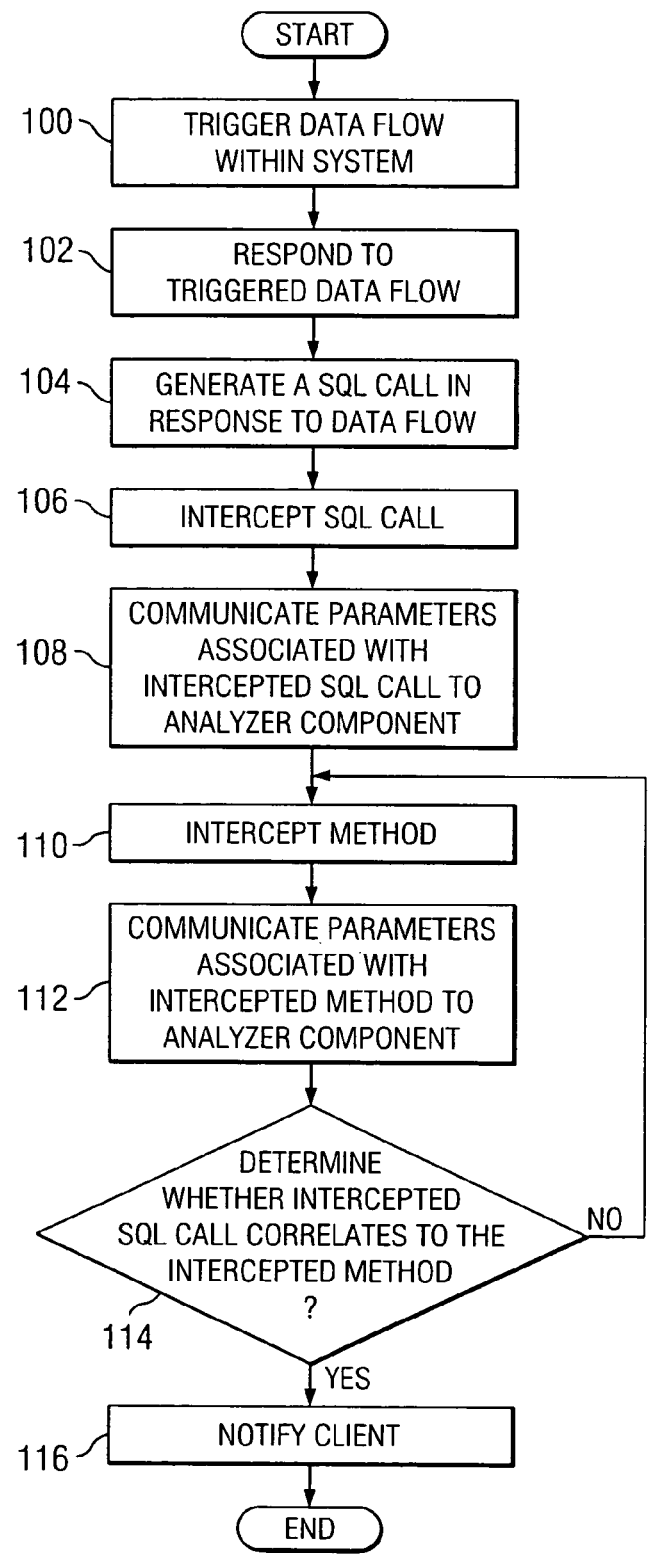
FIG. 3 illustrates an example method for performance monitoring of method calls and database calls in an application server.

FIG. 3 illustrates an example method for performance monitoring of method calls 29 and database calls 30 in an application server 18. At step 100, a client 12 triggers a data flow within system 10. For example, client 12 may interact with an application 22 on application server 14. At step 102, an application 22 on application server 14 responds to the data flow triggered by client 12. At step 104, a method 29 within an application 22 generates a SQL call 30 in response to the data flow. At step 106, interceptor component 31 intercepts the SQL call 30 and, at step 108, interceptor component 31 communicates one or more parameters 32 for the intercepted SQL call 30 to analyzer component 18. At step 110, insider component 33 intercepts a method 29, such as a JDBC call, and, at step 112, insider component 33 communicates one or more parameters 34 for the intercepted method 29 to analyzer component 18.

At step 114, analyzer component 18 determines whether the intercepted SQL call 30 correlates to the intercepted method 29 in that the intercepted method 29 generated the SQL call 30. In one embodiment, analyzer component 18 determines whether a correlation exists by comparing one or more parameters 32 for the intercepted SQL call 30 received from interceptor component 31 with one or more corresponding parameters 34 associated with an method 29 received from insider component 33 to determine whether the method 29 generated the intercepted SQL call 30. As an example, if one or more parameters 32 for the intercepted SQL call 30 received from interceptor component 31 match one or more corresponding parameters 34 associated with intercepted method 29 received from insider component 33, analyzer component may conclude that a correlation exists between the intercepted SQL call 30 and the intercepted method 29.

If analyzer component 18 determines at step 114 that intercepted method 29 does not correlate to intercepted SQL call 30, then returns to step 110 to retrieve a next intercepted method 29. If analyzer component 18 determines at step 114 that intercepted method 29 correlates to intercepted SQL call 30 in that intercepted method 29 generated intercepted SQL call 30, then analyzer component 18 may notify client 12 at step 116. For example, analyzer component 18 may initiate generation or update of management console 19 that is displayable on client 12. As another example, analyzer component 18 may initiate communication of a alert notification to client 12. In one embodiment, analyzer component may communicate an alert notification to client 12 if one or more of the parameters 32 associated with the intercepted SQL call 30 exceeds a predetermined threshold.

In certain embodiments, data flows are substantially continuously being generated by clients 12 (or spontaneously) such that interceptor component 31 is substantially continuously intercepting SQL calls 30 and communicating parameters 31 for each intercepted SQL call 30 to analyzer component 18. Similarly, insider component 33 may be substantially continuously intercepting methods 29 such as JDBC calls and communicating parameters 34 associated with the intercepted methods 29 to analyzer component 18. Analyzer component 18 may substantially continuously correlate received intercepted SQL calls 30 with the methods 29 that generated the received intercepted SQL calls 30, such that correlation is performed in substantially real time. In this embodiment, system 10 may enable client 12 to be notified of underperforming SQL calls 30 and their associated methods 29 in substantially real time.

Although the steps of the method are described in a particular order, the present disclosure contemplates the steps of the method being performed in any suitable order, including substantially simultaneously, according to particular needs. For example, insider component 32 and interceptor component 30 may perform their respective steps substantially simultaneously.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system for monitoring performance of one or more database calls comprising:
   at least one electronic computing device comprising:
      an analyzer component;
      an insider component configured to:
         in response to at least one application executing at least one process that generates the one or more database calls:
            monitor substantially continuously a first set of one or more parameters associated with the at least one process, and
            communicate the first set of one or more parameters to the analyzer component; and
      an interceptor component configured to:
         monitor substantially continuously a second set of one or more parameters associated with the one or more database calls, and
         communicate the second set of one or more parameters to the analyzer component,
      wherein the analyzer component is configured to:
         receive the first set of one or more parameters from the insider component,
         receive the second set of one or more parameters from the interceptor component, and
         identify the at least one process that generated the one or more database calls by correlating the first set of one or more parameters with the second set of one or more parameters,
         wherein an identity of the identified at least one process that generated the one or more database calls is displayed.

2. The system of claim 1, wherein the at least one process comprises an object-oriented method and the insider component is operable to communicate the second set of one or more parameters for the object-oriented method in a method call tree to the analyzer component.

3. The system of claim 1, wherein the one or more database calls comprise one or more SQL calls and the second set of one or more parameters comprise:

a SQL statement of the one or more SQL calls;
a SQL execution time of the one or more SQL calls;
one or more SQL exceptions of the one or more SQL calls; and
a timestamp and a thread of execution for the one or more SQL calls.

4. The system of claim 3, wherein the first set of one or more parameters comprise a timestamp and a thread of execution.

5. The system of claim 4, wherein the analyzer component when correlating the first set of one or more parameters with the second set of one or more parameters is further operable to:
compare the timestamp and the thread of execution of the first set of one or more parameters to a corresponding timestamp and the thread of execution of the second set of one or more parameters.

6. The system of claim 1, wherein the analyzer component substantially continuously provides first identifiers of the one or more database calls and second identifiers of the identified at least one process that generated the one or more database calls to the client in substantially real time.

7. The system of claim 1, wherein the analyzer component is further operable to:
collect the second set of one or more parameters; and
display an alert notification to the client if at least one of the second set of one or more parameters exceeds a predetermined threshold value.

8. The system of claim 1, wherein the analyzer component is further operable to display a management console to the client, wherein the management console presents a view of the provided information.

9. A method for monitoring performance of one or more database calls comprising:
in response to at least one application executing at least one process:
monitoring, by an insider component, substantially continuously a first set of one or more parameters associated with the at least one process;
communicating, by the insider component, the first set of one or more parameters to an analyzer component;
monitoring, by an interceptor component, substantially continuously a second set of one or more parameters associated with the one or more database calls;
communicating, by the interceptor component, the second set of one or more parameters to an analyzer component;
identifying, by the analyzer component, the at least one process that generated the one or more database calls by correlating the first set of one or more parameters with the second set of one or more parameters; and
displaying an identity of the identified at least one process that generated the one or more database calls.

10. The method of claim 9, wherein the at least one process comprises an object-oriented method; and
processing the second set of one or more parameters for the object-oriented method in a method call tree.

11. The method of claim 9, wherein the one or more database calls comprise one or more SQL calls and the second set of one or more parameters comprise:
a SQL statement of the one or more SQL calls;
a SQL execution time of the one or more SQL calls;
one or more SQL exceptions of the one or more SQL calls; and
a timestamp and a thread of execution for the one or more SQL calls.

12. The method of claim 11, wherein the first set of one or more parameters comprise a timestamp and a thread of execution.

13. The method of claim 12, wherein correlating the first set of one or more parameters with the second set of one or more parameters further comprises:
comparing the timestamp and the thread of execution of the first set of one or more parameters to a corresponding timestamp and the thread of execution of the second set of one or more parameters.

14. The method of claim 9, further comprising:
providing substantially continuousiy first identifiers of the one or more database calls and second identifiers of the identified at least one process that generated the one or more database calls to the client in substantially real time.

15. The method of claim 9, further comprising:
collecting the second set of one or more parameters; and
displaying an alert notification to the client if at least one of the second set of one or more parameters exceeds a predetermined threshold value.

16. The method of claim 9, further comprising:
displaying a management console to the client, wherein the management console presents a view of the provided information.

17. A tangible computer readable medium containing computer-executable instructions for monitoring performance of one or more database calls, the instructions operable when executed by one or more processors to:
in response to at least one application executing at least one process:
monitor, by an insider component, substantially continuously a first set of one or more parameters associated with the at least one process;
communicate, by the insider component, the first set of one or more parameters to an analyzer component;
monitor, by an interceptor component, substantially continuously a second set of one or more parameters associated with the one or more database calls;
communicate, by the interceptor component, the second set of one or more parameters to the analyzer component;
identify, by the analyzer component, the at least one process that generated the one or more database calls by correlating the first set of one or more parameters with the second set of one or more parameters; and display an identity of te-a-Glient the identified at least one process that generated the one or more database calls.

18. The tangible computer readable medium of claim 17, wherein the at least one process comprises an object-oriented method and the insider component is operable to communicate the second set of one or more parameters for the object-oriented method in a method call tree to the analyzer component.

19. The tangible computer readable medium of claim 17, wherein the one or more database calls comprise one or more SQL calls and the second set of one or more parameters comprise:
a SQL statement of the one or more SQL calls;
a SQL execution time of the one or more SQL calls;
one or more SQL exceptions of the one or more SQL calls; and
a timestamp and a thread of execution for the one or more SQL calls.

20. The tangible computer readable medium of claim 19, wherein the first set of one or more parameters comprise a timestamp and a thread of execution.

21. The tangible computer readable medium of claim 20, wherein when correlating the first set of one or more parameters with the second set of one or more parameters, is further operable to:
  compare the timestamp and the thread of execution of the first set of one or more parameters to a corresponding timestamp and the thread of execution of the second set of one or more parameters.

22. The tangible computer readable medium of claim 17, further operable to:
  substantially continuously provide first identifiers of the one or more database calls and second identifiers of the identified at least one process that generated the one or more database calls to the client in substantially real time.

23. The tangible computer readable medium of claim 17, further operable to:
  collect the second set of one or more parameters; and
  display an alert notification to the client if at least one of the second set of one or more parameters exceeds a predetermined threshold value.

24. The tangible computer readable medium of claim 17, further operable to:
  display a management console to the client, wherein the management console presents a view of the provided information.

* * * * *